(12) United States Patent
Klose et al.

(10) Patent No.: US 6,198,811 B1
(45) Date of Patent: Mar. 6, 2001

(54) SYSTEMS AND METHODS FOR EXTRACTING SWITCH DATA

(75) Inventors: Steve W. Klose, Birmingham; Leonard R. Fowler, Wilsonville, both of AL (US)

(73) Assignee: Bellsouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/115,614

(22) Filed: Jul. 12, 1998

(51) Int. Cl.[7] ................................................ H04M 15/00
(52) U.S. Cl. ........................ 379/133; 379/111; 379/113; 379/134
(58) Field of Search .................. 379/111–116, 119–120, 379/124, 126, 127, 133–134, 144–145; 455/406–408

(56) References Cited

U.S. PATENT DOCUMENTS

| | | | |
|---|---|---|---|
| 5,333,183 | 7/1994 | Herbert | 379/112 |
| 5,768,353 | 6/1998 | Browne | 379/114 |
| 5,832,068 | * 11/1998 | Smith | 379/113 |
| 5,873,030 | * 2/1999 | Mechling et al. | 455/408 |
| 5,875,236 | * 2/1999 | Jankowitz et al. | 379/114 |
| 5,950,121 | * 9/1999 | Kaminsky et al. | 455/410 |

FOREIGN PATENT DOCUMENTS

| | | | |
|---|---|---|---|
| 0595539 | 5/1994 | (EP) | G06F/15/415 |
| WO 93/12606 | 6/1993 | (WO) | H04M/11/00 |
| WO 95/24093 | 9/1995 | (WO) | H04M/11/00 |
| WO 96/32806 | 10/1996 | (WO) | H04M/15/00 |
| WO 97/24658 | 7/1997 | (WO) | G06F/9/00 |

\* cited by examiner

Primary Examiner—Duc Nguyen
(74) Attorney, Agent, or Firm—James L. Ewing, IV; Benjamin D. Driscoll; Kilpatrick Stockton LLP

(57) ABSTRACT

A system and method downloads data and reconfigures the data into a database. A telephone user purchases a specific number of lines and specific services (i.e., call waiting) from a telephone company. The telephony company then programs a switch associated with that user so that the user receives the services purchased. The telephone company also inserts the user's purchases into a database used for generating the user's bills. Discrepancies can occur between the data in the switch and the data in the billing database. Billing correction is performed by downloading all of the data within a switch, reconfiguring the data into a database and then comparing the switch database against the billing database to detect billing errors. To facilitate ease of this billing correction process, the switch database is transmitted to the billing correction center via a network instead of the traditional method of using direct tape copies of the switch being physically transported to the billing correction center.

16 Claims, 5 Drawing Sheets

SYSTEMS AND METHODS FOR EXTRACTING SWITCH DATA

FIELD OF THE INVENTION

The present invention relates to systems and methods for extracting information from switches and billing systems which is used, for instance, to reconcile the data between the switches and the billing systems. A reconciliation system and process then generates data which is used to make billing adjustments.

BACKGROUND OF THE INVENTION

A central office switch handles many features for a customer at the local level. These features include how many lines a customer is using and whether or not these lines have select features, such as call-waiting and call-forwarding. How the switch is programmed will establish which features and service each customer receives.

While telephone features and services are provided by the switch, billing is provided for by a different system. A Customer Record Information System (CRIS) 11 is a database containing a record of all of the features and service each customer purchases from the phone company. CRIS 11 is used to generate the bill the customer receives. It is therefore clear that the services and features provided by the switch must correspond to the data stored in CRIS 11 in order for the phone company to receive the money it is owed (i.e., avoid underbilling) and to not charge the customers for services and features they did not purchase (i.e., avoid overbilling).

FIG. 1 shows a traditional system with switches 1 to 3 where billing discrepancies are discovered by having field technicians download the data stored in the switches 1 through 3 to tapes loaded into the tape drives 4 through 6. Typically, these tape drives 4 through 6 support 9-track tapes. Once the switch data is downloaded, the tapes are physically transported, represented with trucks 8 through 10, to a Database Reconciliation Tool (DBRT) 7. DBRT 7 is typically a personal computer (PC).

The DBRT 7 also receives data from CRIS 11. As stated earlier, CRIS 11 is a database of what the service provider understands to be the services and features being used by each customer which is used for billing the customer. Data in CRIS 11 is typically sent to DBRT 7 electronically as shown in FIG. 1. However, CRIS 11 has a tape port (not shown) so that, if necessary, data from CRIS 11 can be transported to DBRT 7 in a manner similar to the manner switch data is currently transported to DBRT 7.

Once the DBRT 7 has the tape data from the switch and CRIS 11, it performs a comparison process, which involves logic comparisons, between the two sets of data to detect discrepancies. Discrepancies are printed on paper 13 and forwarded to an ESSX Billing Reconciliation Unit (EBRU) 14. EBRU 14 is a group of people who manually read the discrepancy report produced by DBRT 7. They will then generate a corrected billing statement 38 for sending to the customer which corresponds to the discrepancies between CRIS 11 and the customer's switch data. In addition to providing customers with corrected bills, EBRU 14 informs the CRIS 11 technicians so they may make adjustments to the data stored in CRIS 11 to avoid incorrect billing in the future.

Supporting EBRU 14 is a Billing Integrity Reconciliation System (BIRS) 15. BIRS 15 tracks activity on accounts and keeps statistics regarding the time an individual in EBRU 14 spends on resolving errors and the dollar amounts of any billing adjustments.

There are many problems associated with conventional collection systems such as the one depicted in FIG. 1. Most of these problems revolve around the utilization of magnetic tapes to transfer data from either the switches 1 to 3 to DBRT 7. First, collecting data via magnetic tape is labor intensive. A technician must travel to the individual switches 1 to 3, manually load and unload the tape into the tape drive of each switch in the phone company's network. The labor intensiveness of this type of data transfer is amplified by a phone company owning and operating a large number of switches. The phone company must therefore maintain and employ a large number of field technicians to complete this work.

It should also be noted that while the data in the CRIS 11 is periodically updated, it is not always 100 per cent synchronized with the data in the switch. This problem arises when a particular customer orders new services, i.e. call-waiting. Ideally, the phone company will update both CRIS 11 and the customer's service in the switch simultaneously. However, should an error occur, one of the two sets of data will be inaccurate. If it is impossible for a field agent to download the data from the customer's switch for a week or so, the discrepancy will not be discovered for a while. If the switch data is incorrect, this week or longer time period before correction could result in a disgruntled customer calling his telephone provider to complain.

Another problem with the conventional collection systems involves the volatility of the tapes. During transport from either the switches 1 to 3 or CRIS 11, the tapes may be erased or otherwise damaged due to extreme temperature, electromagnetic field, or physical impact.

Another problem with the conventional collection systems involves the cost of purchasing and maintaining all of the tapes needed to transfer the data from the plurality of switches. Even a small phone company will probably operate thousands of switches requiring it to invest thousands of dollars in a plurality of tapes.

Another problem with the conventional collection systems is the frequency that switch downloads are performed. Due to limited manpower and limited funds which can be allocated to the tapes themselves, only a percentage of all the switches a phone company operates can be downloaded in a day. Should the phone company suffer a shortage of labor or tapes, it would severely harm the phone company's ability to correct billing errors. The end result could be a switch which is not downloaded for a long period of time such that a customer is continually billed incorrectly to the point that the customer becomes disgruntled with the phone company.

Also, due to the limited manpower, there exists a latency period from the point when the switch data is downloaded to a magnetic tape to the point when the data is inputted into DBRT 7. Thus, a comparison between data retrieved from CRIS 11 today and data retrieved from a switch yesterday could introduce a discrepancy where none exists. It is simply an error of comparing old data which was in the switch to updated data in the CRIS 11.

SUMMARY OF THE INVENTION

The present invention addresses the problems described above by providing systems and methods for extracting switch data. The systems of the present invention improve upon those above noted deficiencies. In particular, the systems of the present invention allow for data to be downloaded into the DBRT from the switch much faster than is presently possible.

The present invention also substantially reduces the costs in tape expenditures.

The present invention also saves on labor costs in that the data is now communicated directly to the DBRT instead of relying on transported tapes.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION OF THE INVENTION

Figure 1:
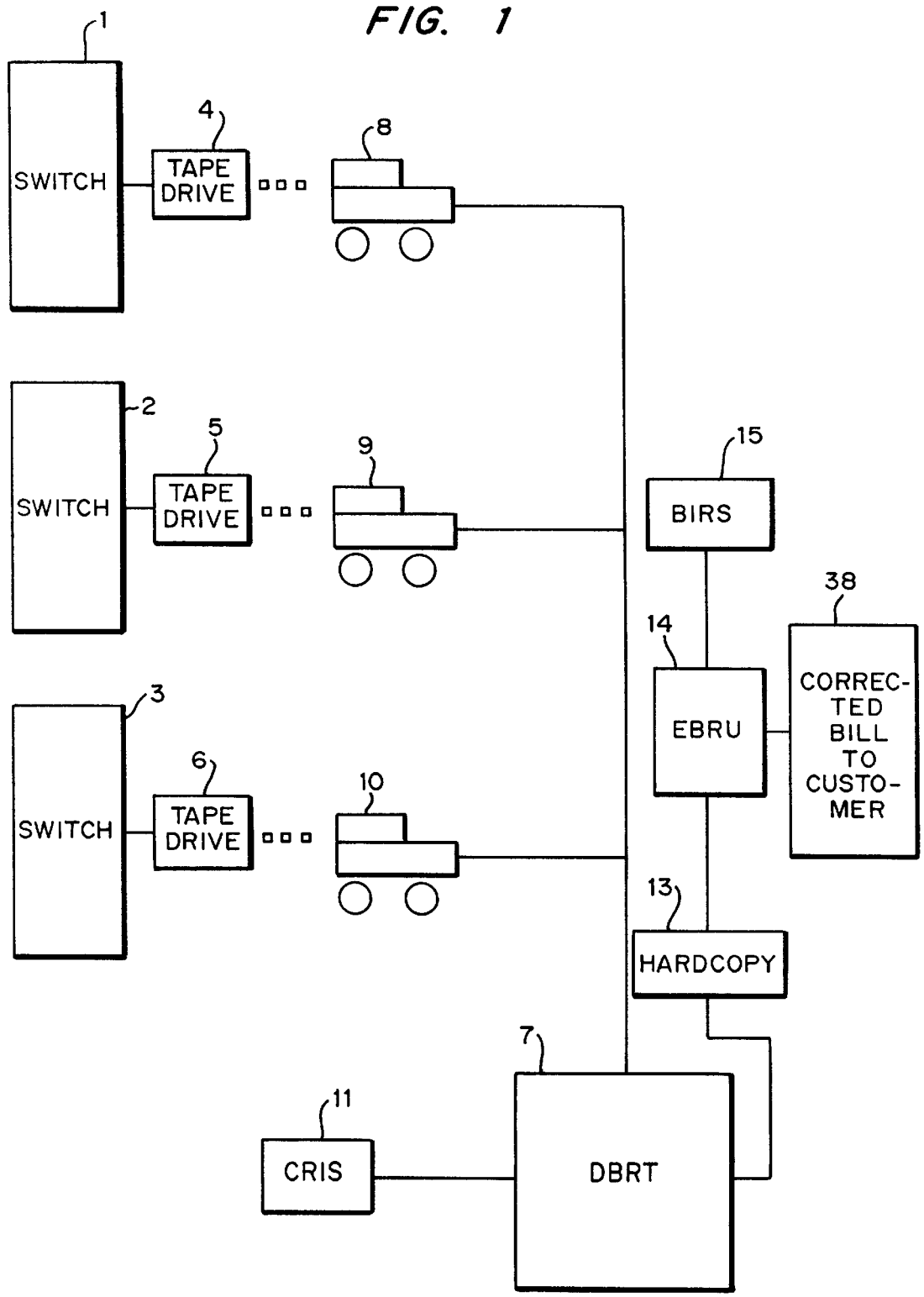
FIG. 1 is a block diagram of a first example of a conventional billing reconciliation system.
Figure 2:
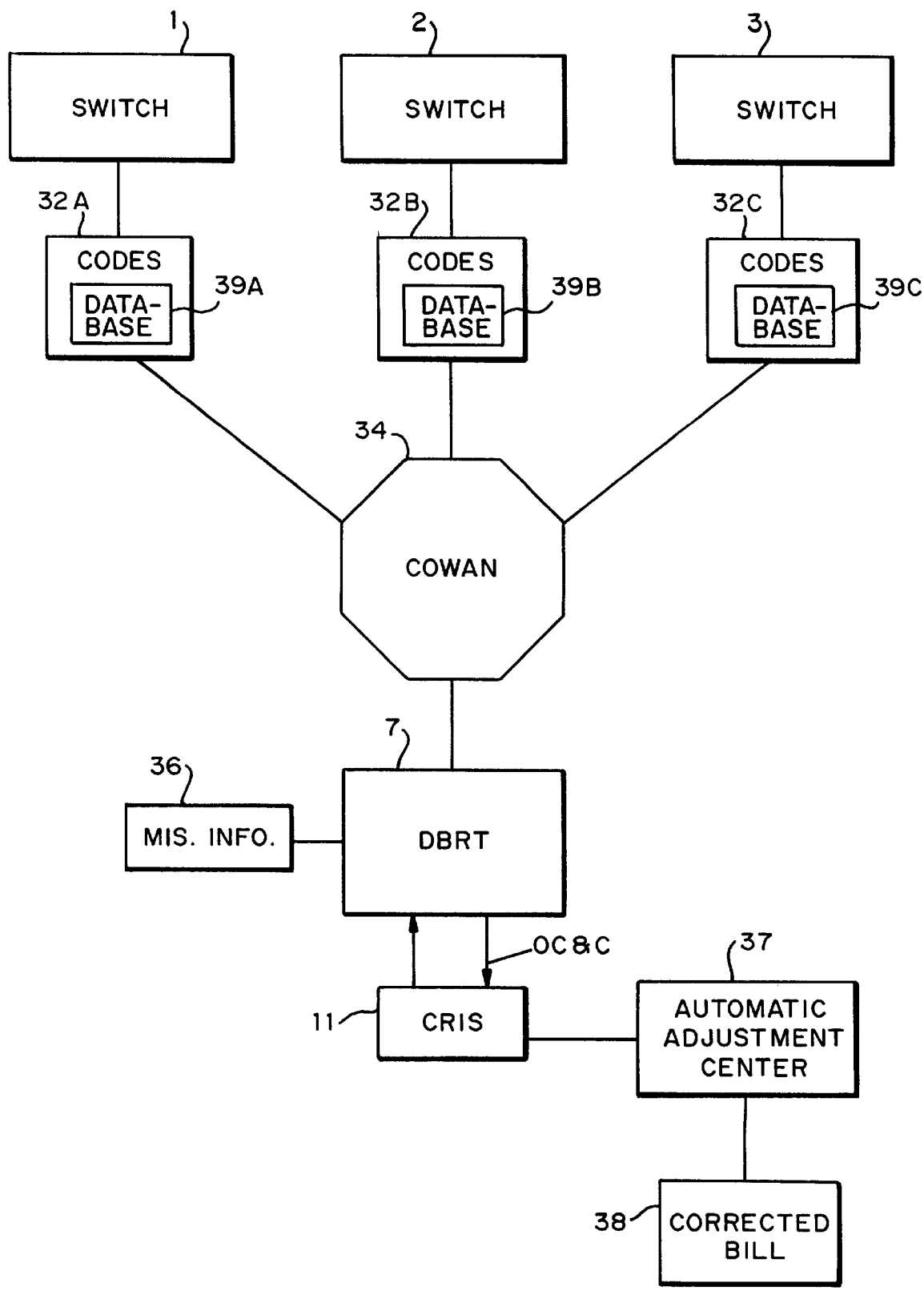
FIG. 2 is a block diagram of a billing reconciliation system according to a preferred embodiment of the present invention.

Reference will now be made in detail to preferred embodiments of the invention, nonlimiting examples of which are illustrated in the accompanying drawings. FIG. 2 shows a system according to a preferred embodiment of the present invention. The system includes a Customer Record Information System (CRIS) 11 coupled to a Database Reconciliation Tool (DBRT) 7 electronically. A plurality of Central Office Data Extract Systems (CODES) 32a–c read the data in switches 1–3 and each CODES 32a–c produces a proxy database 39a–c. The CODES 32a–c transmit a portion of each proxy database 39a–c to DBRT 7 via a Central Office Wide Area Network (COWAN) 34. As will become more apparent from the description below, this system eliminates the need for a tape to communicate data between any switch 1–3 and DBRT 7.

DBRT 7 compares the data it receives from the plurality of CODES 32a–c with the data it receives from CRIS 11. DBRT 7 then forwards any discrepancies it detects back to CRIS 11, along with additional miscellaneous data 36, in the form of an Other Changes and Credits (OC&C) file. CRIS 11 uses the OC&C file to find the correct customer who needs a billing adjustment and forwards all of the appropriate information to the Automatic Adjustment Center 37. The Automatic Adjustment Center 37 uses the data it receives from CRIS 11 to generate the corrected billing statement 38 which is then forwarded to the customer.

Figure 3:
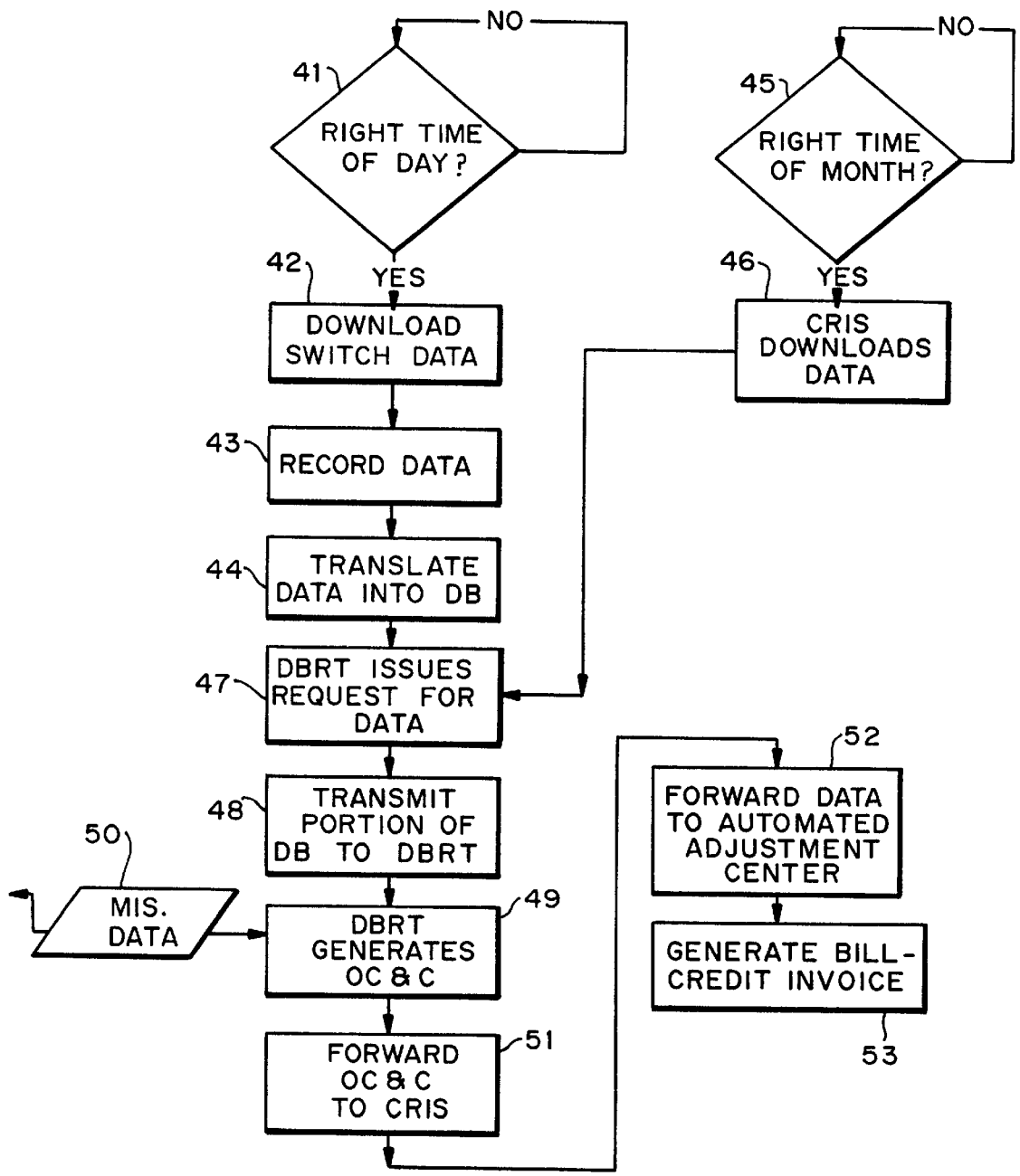
FIG. 3 is a flow chart showing the process steps in determining bill discrepancies according to a preferred method according to the present invention.
Figure 4:
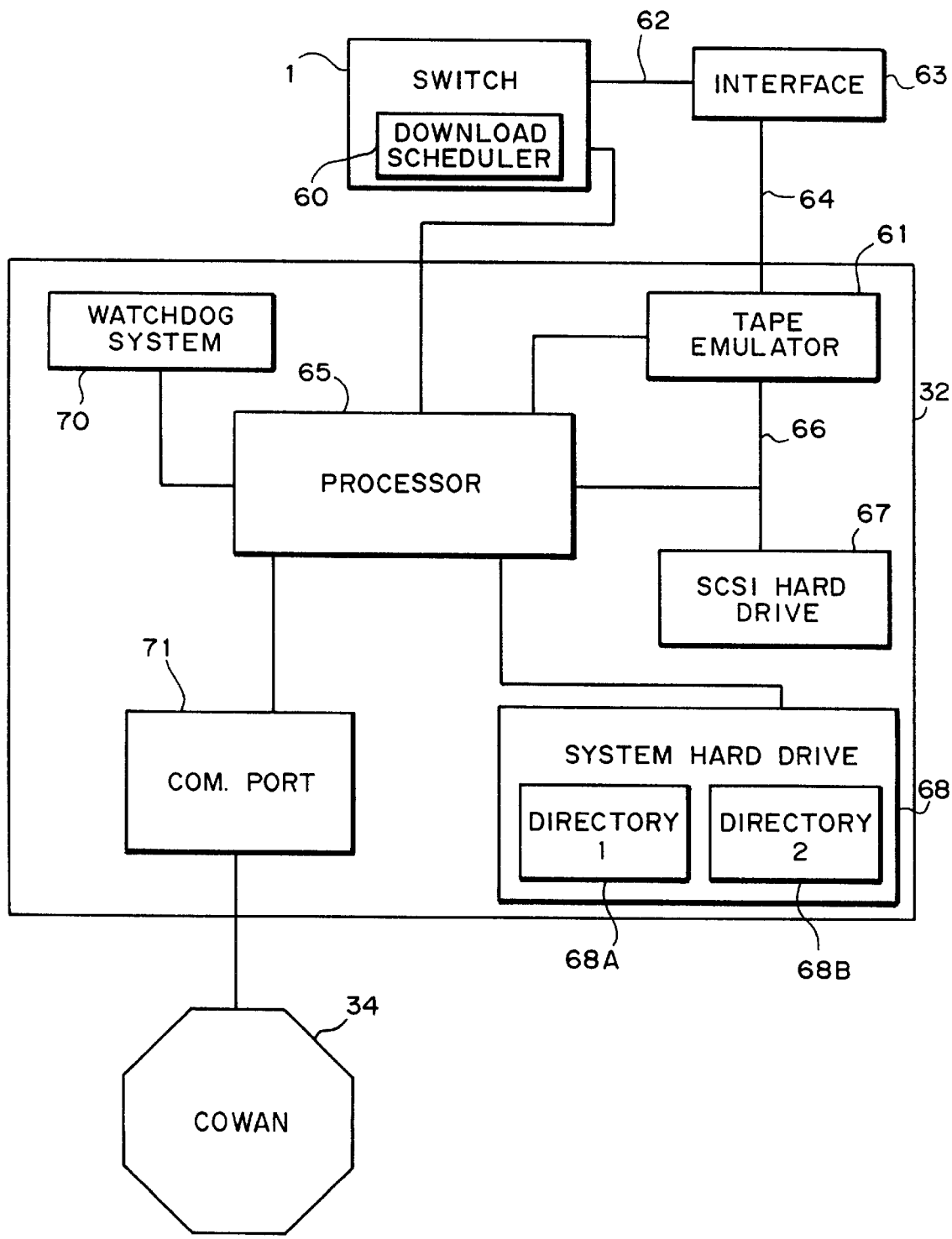
FIG. 4 is a block diagram of a CODES of the present invention.

FIG. 3 is a flowchart describing a method according to a preferred embodiment of the invention and FIG. 4 is a more detailed diagram of a switch 1 and CODES 32. At step 41, a scheduling mechanism 60 within each switch tells the switch when to download its data. When the scheduling mechanism 60 detects that the time is right, it causes the switch to begin downloading its data at step 42. At step 43, a tape emulator 61 on the CODES 32a detects this download of data and initiates storage of the data on a SCSI hard drive 67. After all the switch data has been downloaded and saved at step 43, the CODES 32a translates the downloaded switch's data into the proxy database 39a at step 44. Typically, the downloading of data occurs once a day so the proxy database 39a associated with the data in switch 1 is updated once a day.

The proxy databases 39a–c are representations of the data stored in the switch which is used to determine billing discrepancies instead of the actual switch data itself. By using the proxy databases 39a–c instead of the raw switch data, the systems and methods according to the present invention achieve advantages which will be described later.

At step 45, CRIS 11 goes through a similar timing check as the switches 1–3. At step 46, CRIS 11 downloads a portion of its data to DBRT 7. It should be noted that CRIS 11 does not download data for every phone number everyday. Instead, CRIS 11 will select a percentage of all phone numbers to be checked and forward the corresponding data to DBRT 7. In this manner, CRIS 11 determines which of the millions of customers' services will be checked that day. Typically, CRIS 11 segregates customers based on their area code and exchange number (i.e., 123-456-xxxx where the digits are where the segregation occurs). Upon receipt of this data from CRIS 11, DBRT 7 determines where each number which it received from CRIS 11 resides in the network. It then issues contract requests to the appropriate CODES 32a–c informing those CODES 32a–c which portion of their proxy databases 39a–c is needed for billing reconciliation at that time at step 47. At step 48, the CODES 32a–c receive the contract requests and transmit only the requested portion of their proxy databases 39a–c to DBRT 7 thereby fulfilling the contract requests.

At step 49, DBRT 7 receives the portions of the proxy database 39a information and sends an acknowledgment signal back to CODES 32a informing it that the portion of proxy database 39a requested was received. After reception of the proxy database is completed, DBRT 7 performs logic rules based comparisons on the data received from CRIS 11 and CODES 32a at step 49. The logic comparison involves the use of a rules database which defines what the relationship is supposed to be between the proxy database data and the CRIS data. This type of comparison determines discrepancies between the two sets of data.

Also at step 49, DBRT 7 inputs additional miscellaneous data 50 and combines the miscellaneous data to form the OC&C. At step 51, DBRT 7 forwards the OC&C to CRIS 11.

At step 52, CRIS 11 uses the OC&C to "locate" the appropriate customer's data within its database. Once the appropriate customer is found, CRIS 11 forwards a report to the Automatic Adjustment Center 37. The Automatic Adjustment Center 37 generates a corrected bill for forwarding to the customer at step 53.

FIG. 4 shows a more detailed block diagram of the CODES 32 according to a preferred embodiment of the invention. In this example, the switch 1 controls the services and features a customer purchases from his phone company. The switch 1 contains the scheduling mechanism 60 which is used to control when the switch 1 automatically begins to download all of its data. The switch 1 outputs its data to a tape emulator 61 via buses 62 and 64 and an interface 63.

Interface 63 is used to translate the output of the data from the switch. Tape emulator 61 is designed to receive PERTEC level signals. PERTEC signals are an industry standard used for tape. Should the switch 1 output data in a different format, say SCSI, the interface 63 is used to translate those signals from SCSI into PERTEC level signals so they are compatible with the tape emulator 61. Should the switch 1 output data in PERTEC format, the interface 63 would not be needed and can be removed.

The tape emulator 61 receives the PERTEC level, raw switch data and translates it into SCSI format for transmission over a SCSI bus 66. The SCSI hard drive 67 is coupled to the SCSI bus 66 to receive the SCSI formatted switch data under control of the tape emulator 61. A processor 65 retrieves the SCSI data from the SCSI hard drive 67, converts the raw switch data into the proxy database 39a and stores the proxy database in system hard drive 68.

As shown in FIG. 4, the system hard drive 68 has two directories 68a and 68b used to store proxy databases. By using two directories, the CODES 32a maintains a copy of the proxy database associated with the present data dump and a copy of the proxy database associated with the last data dump. This storage technique allows for utilization of one proxy database while the other is being created in the separate directory.

A watchdog system 70 detects conditions such as temperature and low voltage. If a condition occurs that is unfavorable to the CODES 32a, the watchdog system 70 reboots the processor 65. Additionally, the watchdog system 70 receives a heartbeat signal from within the CODES 32a. Should the watchdog system 70 not receive that heartbeat signal after a predetermine time, it will reboot the processor 65. The processor 65 is coupled to a communications (COMM) port 71 which is coupled to the COWAN 34.

Figure 5:
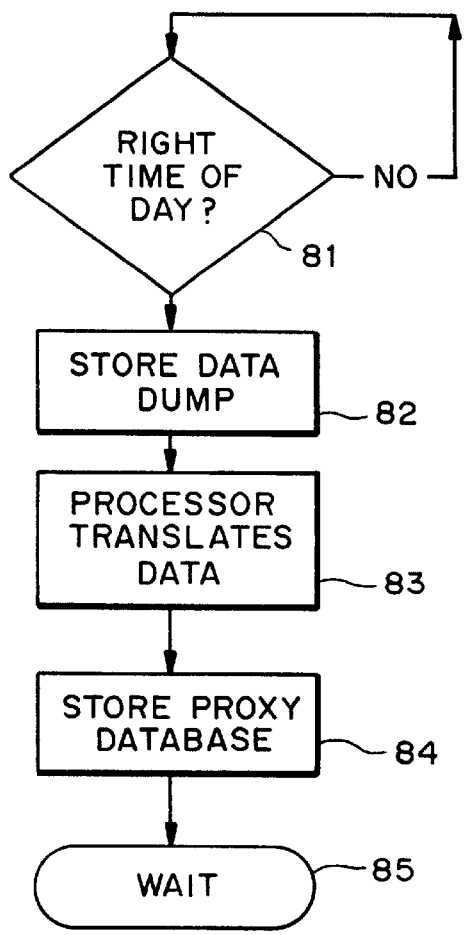
FIG. 5 is a flow chart of a preferred method of operation for the CODES.
Figure 6:
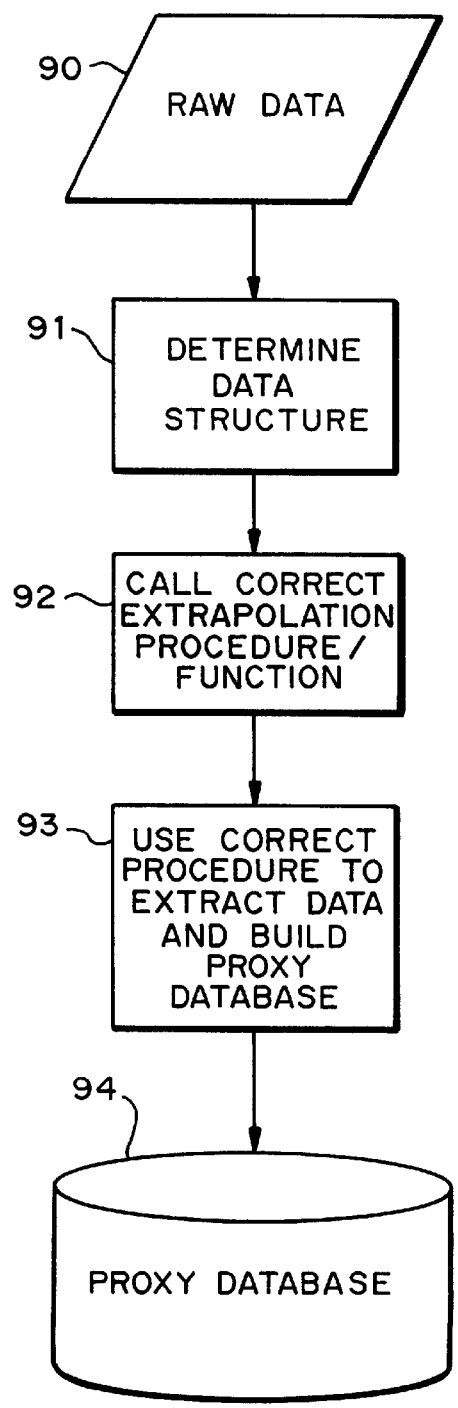
FIG. 6 is a flow chart of a preferred method of operation for the proxy database.

FIG. 5 is a flowchart showing a preferred method of operation for the CODES 32a–c. At step 81, the scheduling mechanism 60 within the switch 1 detects a particular clock reading so as to initiate the switch to begin downloading data at step 82.

The tape emulator 61 triggers the SCSI hard drive 67 to receive this data dump at step 82 for storage. At step 83, the processor 65 detects when the SCSI hard drive 67 has received all of the data from the tape emulator 61 and then translates the raw switch data into the proxy database 39a.

As the processor 65 is translating the switch data into the proxy database 39a, it stores the proxy database information onto one of the system hard drive directories 68a or 68b at step 84.

After the proxy database 39a is created and stored, the CODES 32a waits at step 85 to receive a contract request from DBRT 7. Once the CODES 32a has received the contract request, it will transmit the appropriate portions of the proxy database 39a over the COWAN 34.

Some advantages of the present invention should be noted. First, the use of the interface 63 also allows for future switches to be developed without the need to redevelop the CODES 32a. The interface 63 can therefore be used with a switch developed to outputs its data in a new format with the interface 63 converting that new format into the tape emulator compatible format PERTEC. Thus, the utilization of the tape emulator 61 and interface 63 gives the CODES 32 of the present invention universal application to both existing switches and future switches.

Beyond storing a copy of the switch onto the SCSI hard drive 67, the processor 65 performs a transformation on the switch data so as to create the proxy database 39a which is then stored in the system hard drive 68. The proxy database 39a is a mirror image of the data within the switch. By storing the switch data in the format of the proxy database 39a, the system is able to perform relational operations and can therefore, for instance, locate specific information stored within the proxy database 39a.

As an example, the contract request form DBRT 7 only needs specific information from each switch when performing reconciliation. Thus, properly structured database queries into the CODES 32a will cause the CODES 32a only to send the needed information, and no more, to DBRT 7. Thus, traffic over the COWAN 34 is much less than would otherwise occur if the entire proxy database 39a were sent to the DBRT 7 every time billing reconciliation is performed.

FIG. 7 shows a preferred process by which the CODES 32a–c translates the raw switch data into the proxy databases 39a–c. The raw switch data is received at step 90 and the processor 65 determines the data structure of a block of data read from the SCSI hard drive 67. It should be noted that there are thousands of data structures used within a switch where different values within a particular data structure will give a customer different services. For example, for a single customer who needs 'x' number of telephone lines, with 'y' of these line receiving call waiting and 'z' of these lines receiving caller ID, the customer would be assigned particular data values within a particular data structure. A different customer who only needs 'j' telephone lines with 'k' lines receiving call forwarding and 'l' lines using a phone company provided voice mail system would be assigned either a different data structure or be given different values in the data structure used for the first customer.

Once the processor 65 has correctly identified the appropriate data structure pertaining to a customer, the processor 65 calls the corresponding procedure or function used to specifically extract the data from that type of data structure at step 92. At step 93, the processor 65, through the specified extracting procedure or function, determines the value of the bits and data words in that data structure to determine what values to insert into the proxy database 39a.

Each type of switch uses different word data structures. Due to this variety, the CODES 32a–c contains many data structures and extraction procedures which correspond to all of the features and services provided by each type of switch. In other words, CODES 32a–c are not specific to just a subset of all switches but instead are able to operate across a wide variety of switches. Thus, should a phone company decide to replace a switch with an existing switch whose data structures have already been written, the phone company would only need to inform the CODES 32a–c that it is no longer translating data from switch x, but it is now being expected to translate data from switch y. Now CODES 32a–c invokes the proper, already written, procedures and functions for proper database translation.

The forgoing description of the preferred embodiments of the invention has been presented only for the purpose of illustration and description and is not intended to be exhaustive or to limit the invention to the precise forms disclosed. Many modifications and variations are possible in light of the above teaching.

For instance, the tape emulator 61 is designed to interface with the SCSI hard drive 67. However, the tape emulator 61 can be replaced with another interface which is compatible with writeable CD ROM, DAT, removable disk drives and the 9-track tapes of the conventional collection systems. Additionally, while a specific network, the COWAN, has been described in this application, it should be understood by those of ordinary skill in the art that any network system which couples DBRT to the plurality of CODES will also work effectively.

The embodiments were chosen and described in order to explain the principles of the invention and their practical application so as to enable others skilled in the art to utilize the invention and various embodiments and with various modifications as are suited to the particular use contemplated.

What is claimed is:

1. A system for use in collecting information on a telephony network, comprising:

a data collecting system, coupled to the telephony network, for receiving customer usage information representing telephony services presented to a customer by the telephony network;

a customer record information system for storing custom record information concerning the telephony services recorded as being available and billed to the customer by the telephony network; and a reconciliation center for receiving the customer record information from the customer record information system, for receiving the customer usage information from the data collection system, and for comparing the customer usage information to the customer record information to detect discrepancies between the customer record information and the customer usage information such that the customer receives the correct amount of telephony services for which he/she is being billed.

2. The system of claim 1, wherein the data collection system obtains the customer usage information from a switch from within the network.

3. The system of claim 2, wherein the data collection system is connected to an existing tape port on the switch.

4. The system of claim 1, wherein the data collection system includes an interface for translating the customer usage information from a first format into a second format data.

5. The system of claim 1, wherein the reconciliation system is for detecting billing discrepancies between the service actually presented by the customer and the services recorded as being available to the customer.

6. The system of claim 1, further comprising a plurality of data collection systems for collecting customer usage information from a plurality of locations within the network and wherein the reconciliation center receives the customer usage information from the plurality of data collection systems.

7. The system of claim 1, wherein the data collection system obtains customer usage information from a telephony network.

8. The system of claim 1, wherein the data collection system transmits the customer usage information to the reconciliation system.

9. The system of claim 1, further comprising an adjustment center for receiving any discrepancies detected by the reconciliation center and for generating billing information for a customer.

10. The system of claim 1, wherein the data collection system obtains the customer usage information at predetermined times.

11. The system of claim 1, wherein the data collection system generates a proxy database having a copy of the customer usage information.

12. The system of claim 11, wherein specific data points are extracted from the proxy database for transmission over the network.

13. A method for use in collecting information or a telephony network, comprising the steps of:

downloading first customer usage information from a first switch where the first customer usage information represents telephony services provided to the first customer from a telephony service provider;

storing the first customer usage information;

translating the first customer usage information into a first database;

transmitting portions of the first database to a reconciliation center;

comparing the portions of the first database to portions of a second database wherein the second database contains first customer record information concerning the telephony services recorded as being available and billed to the first customer by the telephony network;

and generating a report indicative of any discrepancies discovered between the portions of the first database and the second database so that any such discrepancies can be corrected.

14. The method of claim 13, further comprising:

downloading second customer usage information from a second switch wherein the second customer usage information represents services provided to the second customer from the service provider;

translating the second customer usage information into a third database;

transmitting portions of the third database to the reconciliation center;

comparing the portions of the second database to portions of the third database; and generating a report indicative of any discrepancies discovered between the portions of the second database and the third database.

15. The method of claim 13, wherein the portions of the second database sent to the reconciliation center dictate which portions of the first database are sent to the reconciliation center.

16. The method of claim 14, wherein the portions of the second database sent to the reconciliation center dictate which portions of both the first and third databases are sent to the reconciliation center.

\* \* \* \* \*